(12) United States Patent
Koskey, Jr.

(10) Patent No.: US 8,366,300 B2
(45) Date of Patent: Feb. 5, 2013

(54) POND FISH FEEDING INDICATOR

(75) Inventor: James Donald Koskey, Jr., Manitou Springs, CO (US)

(73) Assignee: K & H Manufacturing, Colorado Springs, CO (US)

( * ) Notice: Subject to any disclaimer, the term of this patent is extended or adjusted under 35 U.S.C. 154(b) by 190 days.

(21) Appl. No.: 12/284,973

(22) Filed: Sep. 26, 2008

(65) Prior Publication Data

US 2010/0077964 A1    Apr. 1, 2010

(51) Int. Cl.
*F21V 23/04*    (2006.01)
(52) U.S. Cl. ... 362/276; 362/227; 362/234; 362/249.02; 362/253; 43/17.5; 43/44.99
(58) Field of Classification Search ............ 362/184, 362/227, 234, 249.02, 253, 276, 565, 800, 362/806; 43/17.5, 44.99
See application file for complete search history.

(56) References Cited

U.S. PATENT DOCUMENTS

| | | | | |
|---|---|---|---|---|
| 5,615,512 A | * | 4/1997 | Wang | 43/17.5 |
| 5,898,372 A | * | 4/1999 | Johnson et al. | 340/573.2 |
| 6,196,705 B1 | * | 3/2001 | Finke et al. | 362/276 |

* cited by examiner

*Primary Examiner* — Sandra L O Shea
*Assistant Examiner* — Meghan K Dunwiddie
(74) *Attorney, Agent, or Firm* — Dale B Halling

(57) ABSTRACT

The invention is directed to an ornamental pond fish feeding indicator that has a housing with an indicator end. A first LED is enclosed in the housing at the indicator end of the housing. A second LED is also enclosed in the housing at the indicator end of the housing. A temperature sensing circuit is enclosed in the housing. The temperature sensing circuit transmits a signal to the first LED and the second LED. A float is attached to the housing. Using this invention, a pond owner can simply glance at his or her pond and determine whether or not to feed their fish based on the color of the light on top. The light on top of the indicator is red when pond water is below 50 degrees Fahrenheit. If the pond water is 50 degrees or over, the light is green.

12 Claims, 3 Drawing Sheets

POND FISH FEEDING INDICATOR

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Most ornamental pond fish are members of the Koi or Goldfish family. It is widely known in the Pond Industry around the world that members of this species should not eat when water temperatures are below 50 degrees Fahrenheit or approximately 10 degrees Celsius. If the fish are fed when the temperature is below 50 degrees Fahrenheit, they will become sick and may die because their body metabolism slows down at these temperatures. Monitoring of this problem typically occurs twice a year. Spring season, when pond water begins to warm after the cold of winter, and fall, when pond water begins to cool after the warm summer months. During the fall and spring seasons, pond water temperature may fluctuate over or under that threshold on a daily basis until permanent warm weather arrives for summer, or permanent cool arrives for Winter.

The problem with typical pond thermometers is that they incorporate old glass mercury thermometers attached to a floating mechanism. Every day during the spring or fall season, the pond owner must walk out to their pond and physically get on their knees and retrieve the thermometer from the pond water. The mercury thermometer is very difficult to read and in most cases is not accurate because the thermometer is usually only stapled to a cardboard sleeve with the temperatures printed on it. The glass thermometer can slide up or down relative to the printed scale on the cardboard sleeve and therefore give an inaccurate reading. This must be done daily to insure the feeding or not feeding decision of the fish is accurate.

Thus there exists a need for an accurate and easy to read meter which indicates if it is okay to feed the fish in an ornamental pond.

BRIEF SUMMARY OF INVENTION

An ornamental pond fish feeding indicator that overcomes these and other problems has a housing with an indicator end. A first LED is enclosed in the housing at the indicator end of the housing. A second LED is also enclosed in the housing at the indicator end of the housing. A temperature sensing circuit is enclosed in the housing. The temperature sensing circuit transmits a signal to the first LED and the second LED. A float is attached to the housing. Using this invention, a pond owner can simply glance at his or her pond and determine whether or not to feed based on the color of the light on top. The light on top of the indicator is red when pond water is below 50 degrees Fahrenheit. If the pond water is 50 degrees or over, the light is green. Basically, Red=Do not feed, and Green=Ok to feed.

DETAILED DESCRIPTION OF THE INVENTION

The invention is directed to an ornamental pond fish feeding indicator that has a housing with an indicator end. A first LED is enclosed in the housing at the indicator end of the housing. A second LED is also enclosed in the housing at the indicator end of the housing. A temperature sensing circuit is enclosed in the housing. The temperature sensing circuit transmits a signal to the first LED and the second LED. A float is attached to the housing. Using this invention, a pond owner can simply glance at his or her pond and determine whether or not to feed based on the color of the blinking light on top. The light on top of the indicator is red when pond water is below 50 degrees Fahrenheit. If the pond water is 50 degrees or over, the light is green. Basically, Red=Do not feed, and Green=Ok to feed.

Figure 1:
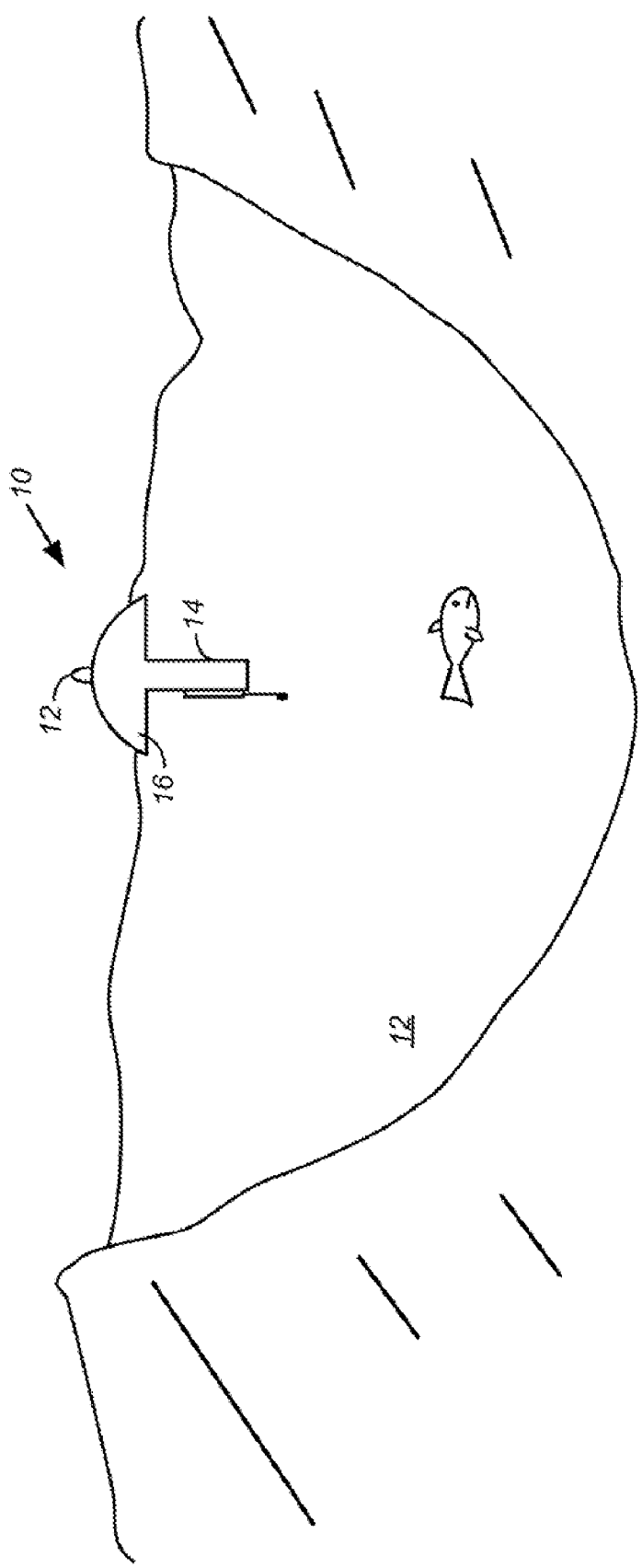
FIG. 1 is a schematic drawing of an ornamental pond fish feeding indicator in an ornamental pond in accordance with one embodiment of the invention.

FIG. 1 is a schematic drawing of an ornamental pond fish feeding indicator 10 in an ornamental pond 12 in accordance with one embodiment of the invention. The ornamental pond fish feeding indicator 10 includes an indicator light 12, which may be a bi-colored LED (Light Emitting Diode). The indicator 10 has a housing 14 and a float 16. A temperature probe 18 extends down into the water to measure the temperature of the water.

Figure 2:
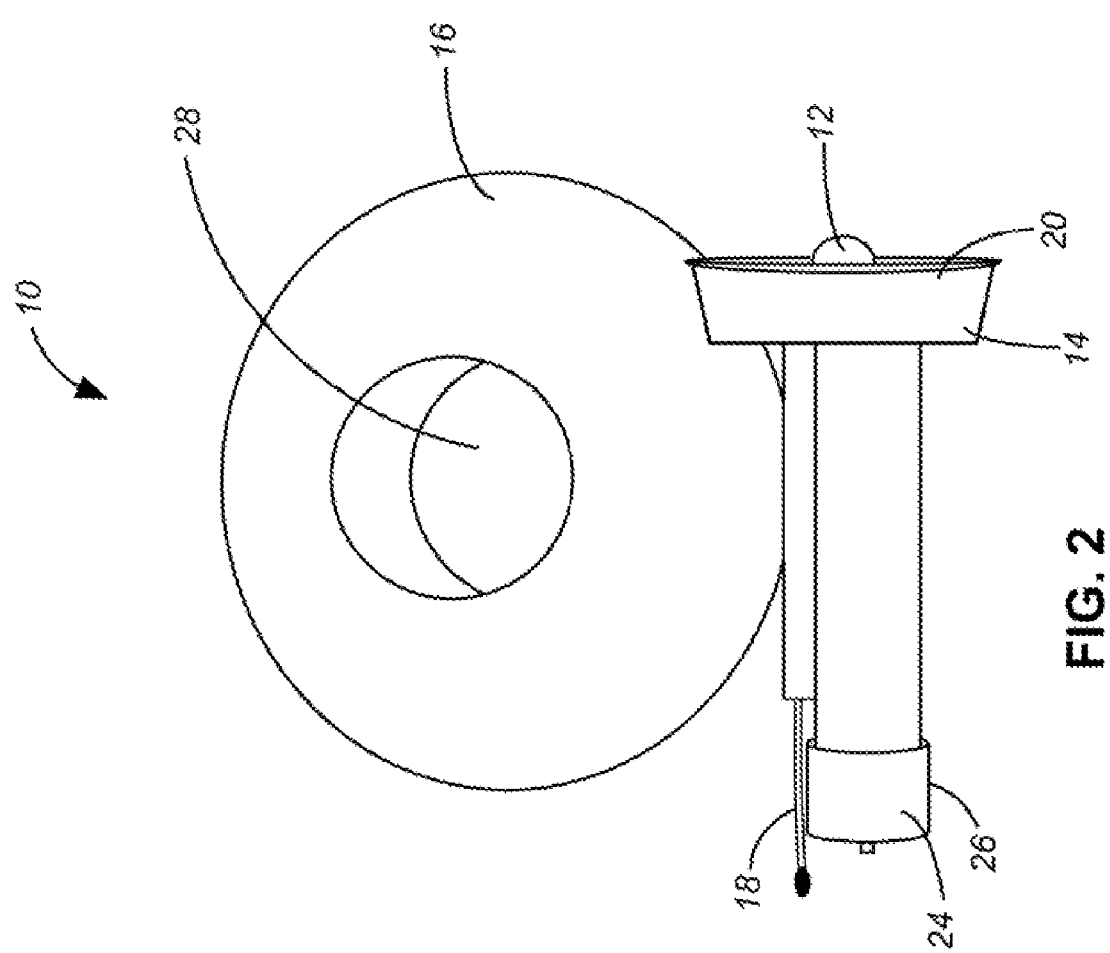
FIG. 2 is a somewhat disassembled top view of the ornamental pond fish feeding indicator in accordance with one embodiment of the invention.

FIG. 2 is a somewhat disassembled top view of the ornamental pond fish feeding indicator 10 in accordance with one embodiment of the invention. The three main parts of the indicator 10 are the housing 14, the float 16 and the temperature probe 18. The indicator 10 has an indicator light 12 that is enclosed in an indicator end 20 of the housing 14. The indicator light 12 may be an LED. A temperature sensing circuit (not shown) is enclosed in the housing 14 and in electrical communication with the temperature probe 18. The housing 14 holds a couple of batteries to run the electronic circuitry. The batteries are accessed by unscrewing the cap 24 on the sensing end 26 of the housing 14. The sensing end 26 of the housing extends through the central orifice 28 of the float 16. The lip formed by the indicator end 20 of the housing 14 prevents the housing 14 from slipping into the water.

Figure 3:
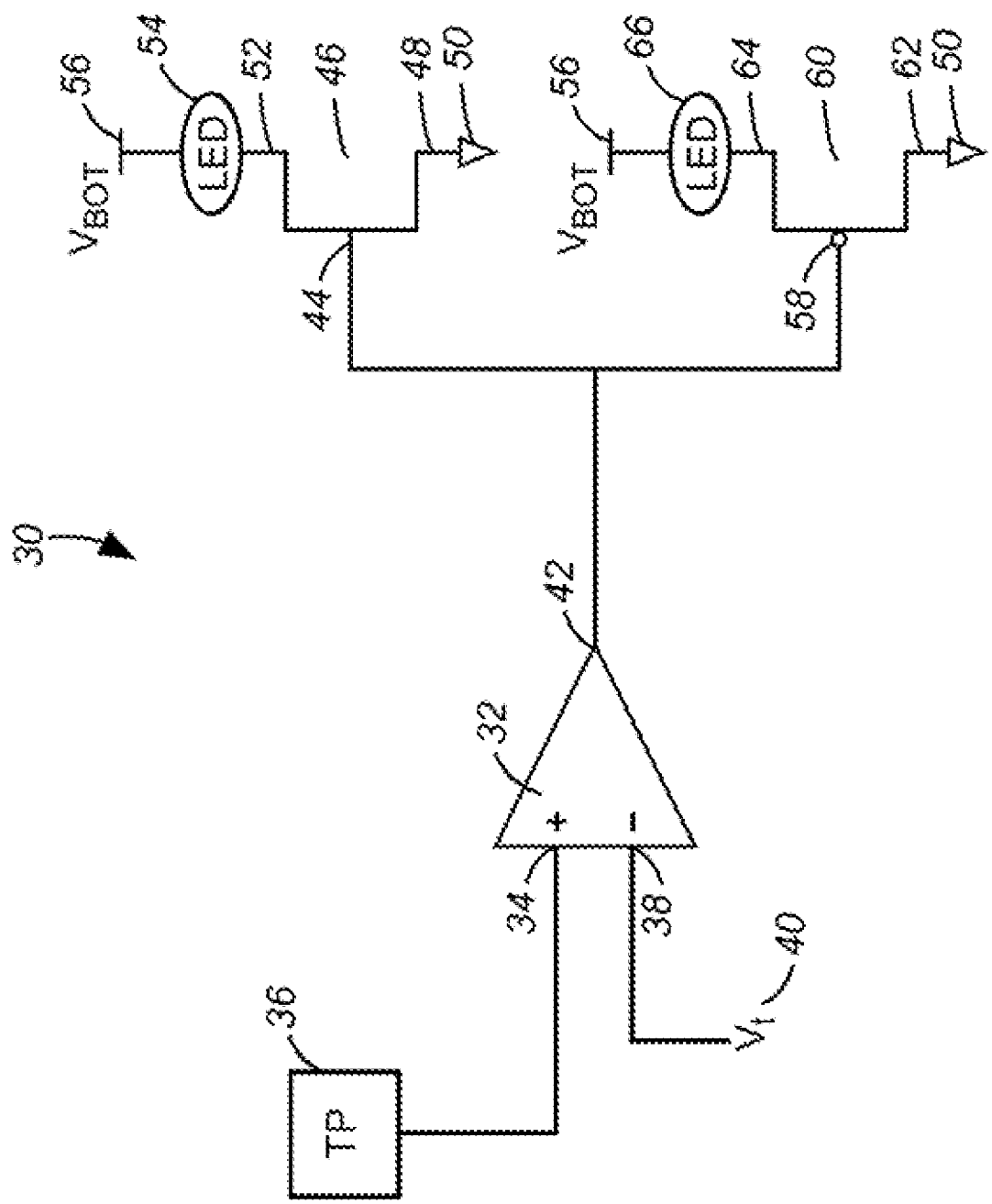
FIG. 3 is an electrical schematic diagram of a circuit used to control the ornamental pond fish feeding indicator in accordance with one embodiment of the invention.

FIG. 3 is an electrical schematic diagram of a circuit 30 used to control the ornamental pond fish feeding indicator in accordance with one embodiment of the invention. The temperature sensing circuit 30 has a comparator 32 with a positive input coupled to the temperature probe 36. A negative input 38 of the comparator 32 is coupled to a threshold voltage 40, which is set to have a voltage that is equal to the voltage out of the temperature probe 36 at fifty degrees Fahrenheit. The output 42 of the comparator 32 is coupled to a gate 44 of an n-channel transistor 46. The source 48 of transistor 46 is coupled to ground 50. The drain 52 is coupled to an LED 54 and the LED 54 is coupled to the power supply (Vbat) 56. The output 42 of the comparator 32 is also coupled to a gate 58 of a p-channel transistor 60. A drain 62 of the transistor 60 is coupled to ground 50. A source 64 of transistor 60 is coupled to a second LED 66 and the LED 66 is coupled to the power supply (Vbat) 56. In one embodiment, the LEDs 46 and 60 are enclosed in the same housing, such as in a bi-color LED. Note that this circuit diagram is representative and other circuits can also perform the function necessary to operate this invention. All such circuits are encompassed within the invention and attached claims.

In operation, when the temperature is above fifty degrees Fahrenheit the output 42 of the comparator 32 is a positive voltage which turns on transistor 46 and turns off transistor 60. As a result, LED 54 is on and LED 66 is off. When the temperature is below fifty degrees Fahrenheit the output 42 of the comparator 32 is a negative voltage which turns off transistor 46 and turns on transistor 60. As a result, LED 54 is off and LED 66 is on. Since LED 54 is a different color than LED 66, the user can easily and accurately tell whether it is okay to feed their fish. Note that a thermocouple temperature probe is much more accurate than a mercury or alcohol glass tube thermometer.

Thus there has been described an ornamental pond fish feeding indicator and method of operation that is accurate and easy to read. Note the owner can usually view the indicator light all the way from their house saving them from having to go out to the pond to determine if they should feed their fish.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An ornamental pond fish feeding indicator, comprising:
    a housing having an indicator end;
    a first LED enclosed in the housing at the indicator end of the housing;
    a second LED enclosed in the housing at the indicator end of the housing;
    a temperature sensing circuit in the housing, the temperature sensing circuit transmitting a signal to the first LED and the second LED;
    a temperature probe that extends outside of the housing; and
    a float attached to the housing.

2. The ornamental pond fish feeding indicator of claim 1, wherein the temperature sensing circuit transmits a feed fish signal to the first LED and the second LED when the temperature is above a threshold temperature.

3. The ornamental pond fish feeding indicator of claim 1, wherein the temperature sensing circuit transmits a do not feed fish signal to the first LED and the second LED when the temperature is above a threshold temperature.

4. The ornamental pond fish feeding indicator of claim 1, wherein the first LED is on when a temperature is in the correct range to feed fish.

5. The ornamental pond fish feeding indicator of claim 1, wherein the second LED is on when a temperature is not in the correct range to feed fish.

6. A method of operating an ornamental pond fish feeding indicator, comprising the steps of:
    determining a water temperature of the ornamental pond;
    when the water temperature is above a threshold temperature, turning on a feed fish okay signal; and
    when the water temperature is not above the threshold temperature, turning off the feed fish okay signal.

7. The method of claim 6, further including the step of when the water temperature is not above the threshold temperature, turning on a do not feed fish signal.

8. The method of claim 6, wherein the step of determining a water temperature includes the step of floating a temperature probe in the ornamental pond.

9. The method of claim 6, wherein the step of turning on the feed fish okay signal includes turning on a light.

10. An ornamental pond fish feeding indicator, comprising:
    a housing having an indicator end;
    a float attached to the housing;
    a temperature probe that extends outside of the housing;
    a light enclosed in the housing at the indicator end of the housing; and
    a temperature sensing circuit in the housing, the temperature sensing circuit connected to the light.

11. The ornamental pond fish feeding indicator of claim 10, wherein the temperature sensing circuit transmits a feed fish signal to the light when the temperature is above a threshold temperature.

12. The ornamental pond fish feeding indicator of claim 11, wherein the temperature sensing circuit transmits a do not feed fish signal to the light when the temperature is above a threshold temperature.

\* \* \* \* \*